(No Model.)

C. H. MILLER.
EXPANSIVE RUBBER BUCKET FOR CHAIN PUMPS.

No. 269,809. Patented Dec. 26, 1882.

Witnesses.
Robt Johnston
Will H Kern

Inventor.
Chas. H. Miller
per
F. A. Lehmann,
Atty.

N. PETERS. Photo-Lithographer, Washington, D. C.

United States Patent Office.

CHARLES H. MILLER, OF COLUMBUS, OHIO.

EXPANSIVE RUBBER BUCKET FOR CHAIN-PUMPS.

SPECIFICATION forming part of Letters Patent No. 269,809, dated December 26, 1882.

Application filed August 21, 1882. (No model.)

*To all whom it may concern:*

Be it known that I, CHARLES H. MILLER, a citizen of the United States of America, residing at Columbus, in the county of Franklin and State of Ohio, have invented certain new and useful Improvements in Expansive Rubber Buckets for Chain-Pumps, of which the following is a specification, reference being had therein to the accompanying drawings.

My invention relates to an improvement in expansive rubber buckets for chain-pumps; and it consists in the combination of the screw-threaded stem, which is made elliptical in cross-section, with the cap having a cavity in its lower end, and the expanding cone, which has its smaller end forged upward into the expansible cap, as will be more fully described hereinafter.

Figure 1:
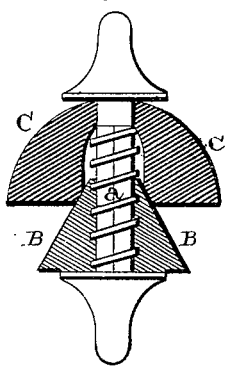
Figure 2:

Figure 1 is a vertical section of a bucket which embodies my invention. Fig. 2 is a horizontal cross-section of the link alone.

Letter A represents a solid link of malleable galvanized iron, molded with a deep screw-thread around its central rod, between the flanged loops on both its ends.

The rod $a$, around which the screw thread winds, is elliptic; but the thread surrounding it does not partake of that form, being circular in its outline, as shown in cross-section in Fig. 2. The elliptic form is given to the rod $a$ for the purpose of holding an elastic nut at any turn desired.

A vulcanized rubber nut, B, in the form of a truncated cone, molded with a hole through its center that is threaded to exactly fit the thread on the rod $a$, is screwed on the link with its base toward the flange on the lower loop. The elasticity of such a nut is sufficient to allow it to be turned past the ridges on the bed of the screw, and to spring back, after passing over them, to its original form and fasten itself firmly.

The upper part of the valve or bucket consists of a cap, C, also made of vulcanized rubber, is semi-globular in form, and molded hollow. The cavity in the cap is of a diameter to just admit the truncated end of the conical nut, which, when screwed up, penetrates deeper into it and expands the bucket to compensate for wear.

To fit a larger bore of a tube the rubber nut may be made cup-shaped, when, by turning the nut upward, its edges are made to bear against and expand the lower rim of the cap-piece. Both these methods of expanding the buckets preserve the life of the rubber and insure its durability by being completely protected against the injurious action of the reel, by which so many buckets have been destroyed.

Having thus described my invention, I claim—

The combination of the screw-threaded stem $a$, made elliptical in cross-section, with the cone B, and the cap C, having a cavity in its under side, substantially as shown and described.

In testimony whereof I affix my signature in presence of two witnesses.

CHARLES H. MILLER.

Witnesses:
 JAMES WATSON,
 T. M. LIVESAY.